(12) United States Patent
Jin et al.

(10) Patent No.: US 8,135,580 B1
(45) Date of Patent: Mar. 13, 2012

(54) MULTI-LANGUAGE RELEVANCE-BASED INDEXING AND SEARCH

(75) Inventors: Yuhui Jin, Seattle, WA (US); Daniel He, Seattle, WA (US); Peng Kang, Beijing (CN); Wenbo Yang, Beijing (CN)

(73) Assignee: Amazon Technologies, Inc., Reno, NV (US)

( * ) Notice: Subject to any disclaimer, the term of this patent is extended or adjusted under 35 U.S.C. 154(b) by 875 days.

(21) Appl. No.: 12/195,083

(22) Filed: Aug. 20, 2008

(51) Int. Cl.
  *G06F 17/27* (2006.01)
  *G06F 17/28* (2006.01)
  *G06F 17/20* (2006.01)
  *G06F 17/30* (2006.01)

(52) U.S. Cl. .............. 704/9; 704/7; 704/8; 707/741

(58) Field of Classification Search .............. None
  See application file for complete search history.

(56) References Cited

U.S. PATENT DOCUMENTS

| | | | |
|---|---|---|---|
| 6,389,387 B1 * | 5/2002 | Poznanski et al. | 704/9 |
| 6,466,901 B1 * | 10/2002 | Loofbourrow et al. | 704/9 |
| 6,901,361 B1 * | 5/2005 | Portilla | 704/8 |
| 7,194,406 B2 * | 3/2007 | Ejerhed et al. | 704/9 |
| 7,260,570 B2 * | 8/2007 | Brown et al. | 1/1 |
| 7,672,831 B2 * | 3/2010 | Todhunter et al. | 704/4 |
| 2003/0149686 A1 * | 8/2003 | Drissi et al. | 707/3 |
| 2008/0275691 A1 * | 11/2008 | Summerlin et al. | 704/8 |
| 2008/0288474 A1 * | 11/2008 | Chin et al. | 707/4 |

OTHER PUBLICATIONS

Oracle, "Oracle Text an Oracle Technical White Paper", available at http://www.oracle.com/technetwork/database/enterprise-edition/11goracletexttwp-133192.pdf, Jun. 2007.*

* cited by examiner

*Primary Examiner* — Brian Albertalli
(74) *Attorney, Agent, or Firm* — Novak Druce & Quigg LLP

(57) ABSTRACT

Indexing and querying in multiple languages is accomplished using an ordered chain of filters and/or other such components. When receiving information to be indexed or for a query, the information can be tokenized and typed based at least in part on the language of each token. The character types can be adjusted if appropriate for the languages, and the tokens can be further segmented using a dictionary for the respective language types. Once appropriate tokens are determined, relevant synonyms in each appropriate language can be determined and typed accordingly. If necessary the case of the tokens and synonyms can be adjusted and further segmented based on punctuation. The terms and synonyms then can be used as part of the index or as part of the search query to include other terms or phrases based on relevance to the original information.

25 Claims, 5 Drawing Sheets

| Term Position | 1 | 2 | 3 | 4 |
|---|---|---|---|---|
| Term Text | 我喜欢费雪的 | animal | train | 产品 |
| Term Type | cjk | word | word | cjk |
| Source Start,End | 0,5 | 6,11 | 12,16 | 17,18 |

*Language-Based Whitespace Filter* — 302

| Term Position | 1 | 2 | 3 | 4 |
|---|---|---|---|---|
| Term Text | 我喜欢费雪的 | animal | train | 产品 |
| Term Type | cjk | word | word | cjk |
| Source Start,End | 0,5 | 6,11 | 12,16 | 17,18 |

*Half Shape Character Filter* — 304

| Term Position | 1 | 2 | 3 | 4 | 5 | 6 | 7 |
|---|---|---|---|---|---|---|---|
| Term Text | 我 | 喜欢 | 费雪 | 的 | animal | train | 产品 |
| Term Type | cjk | cjk | cjk | cjk | word | word | cjk |
| Source Start,End | 0,0 | 1,2 | 3,4 | 5,5 | 6,11 | 12,16 | 17,18 |

*Language Dictionary Filter* — 306

| Term Position | 1 | 2 | 3 | 4 | 5 | 6 | 7 |
|---|---|---|---|---|---|---|---|
| Term Text | 我 | 喜欢 | 费雪 / Fisher-Price | 的 | animal | train | 产品 |
| Term Type | cjk | cjk | cjk / cjk | cjk | word | word | cjk |
| Source Start,End | 0,0 | 1,2 | 3,4 / 3,4 | 5,5 | 6,11 | 12,16 | 17,18 |

*Synonym Filter* — 308

| Term Position | 1 | 2 | 3 | 4 | 5 | 6 | 7 |
|---|---|---|---|---|---|---|---|
| Term Text | 我 | 喜欢 | 费雪 / Fisher-Price | 的 | animal | train | 产品 |
| Term Type | cjk | cjk | cjk / word | cjk | word | word | cjk |
| Source Start,End | 0,0 | 1,2 | 3,4 / 3,4 | 5,5 | 6,11 | 12,16 | 17,18 |

*Language Type Recognition Filter* — 310

| Term Position | 1 | 2 | 3 | 4 | 5 | 6 | 7 |
|---|---|---|---|---|---|---|---|
| | 我 | 喜欢 | 费雪 / fisher-price | 的 | animal | train | 产品 |
| | cjk | cjk | cjk / word | cjk | word | word | cjk |
| Source Start,End | 0,0 | 1,2 | 3,4 / 3,4 | 5,5 | 6,11 | 12,16 | 17,18 |

*Lowercase Filter* — 312

| Term Position | 1 | 2 | 3 | 4 | 5 | 6 | 7 | 8 |
|---|---|---|---|---|---|---|---|---|
| | 我 | 喜欢 | 费雪 / fisher | price | 的 | animal | train | 产品 |
| | cjk | cjk | cjk / word | word | cjk | word | word | cjk |
| Source Start,End | 0,0 | 1,2 | 3,4 / 3,9 | 10,15 | 5,5 | 6,11 | 12,16 | 17,18 |

*Word Delimiter Filter* — 314

FIG. 3

Language-Based Whitespace Filter

| Term Position | 1 | 2 |
|---|---|---|
| Term Text | Fisher-Price | 产品 |
| Term Type | word | cjk |
| Source Start,End | 0,11 | 12,13 |

— 502

Half Shape Character Filter

| Term Position | 1 | 2 |
|---|---|---|
| Term Text | Fisher-Price | 产品 |
| Term Type | word | cjk |
| Source Start,End | 0,11 | 12,13 |

— 504

Lowercase Filter

| Term Position | 1 | 2 |
|---|---|---|
| Term Text | fisher-price | 产品 |
| Term Type | word | cjk |
| Source Start,End | 0,11 | 12,13 |

— 506

Word Delimeter Filter

| Term Position | 1 | 2 | 3 |
|---|---|---|---|
| Term Text | fisher | price | 产品 |
| Term Type | word | word | cjk |
| Source Start,End | 0,6 | 7,11 | 12,13 |

— 508

Language Dictionary Filter

| Term Position | 1 | 2 | 3 |
|---|---|---|---|
| Term Text | fisher | price | 产品 |
| Term Type | word | word | cjk |
| Source Start,End | 0,6 | 7,11 | 12,13 |

MULTI-LANGUAGE RELEVANCE-BASED INDEXING AND SEARCH

BACKGROUND

As an increasing amount of information is available electronically, it is becoming evermore important to provide mechanisms to allow people to search for and locate this information. Several search engines and other such mechanisms have been developed that allow users to search for electronic content by submitting keywords, queries, search criteria, etc. Such mechanisms are typically somewhat limited, however, in the results that can be returned. For example, a user searching for content using keywords in one language typically is not able to receive any and/or accurate results in other languages. Further, there can be many ways to express certain ideas or terms, such that the results might not include the intended content unless the user submits a term exactly as that term is used in an item of content. The problems are further exacerbated when there are synonyms or other relevant expressions in different languages which can prevent the user from obtaining results in those other languages.

Further, as the amount of content and the number of requests for content increase, the level of service can decrease accordingly. In order to improve or maintain a desired quality of service it can be necessary to provide additional servers or other components to the system. Existing approaches to relevance and/or multi-language support have not been sufficiently stable and/or scalable to allow for such expansion while maintaining a consistent level of service.

BRIEF DESCRIPTION OF THE DRAWINGS

Various embodiments in accordance with the present disclosure will be described with reference to the drawings, in which:

FIG. 3 illustrates tables of data for information to be indexed, passing through an ordered chain of filters in accordance with one embodiment;

FIG. 5 illustrates tables of data for search query information passing through an ordered chain of filters in accordance with one embodiment.

DETAILED DESCRIPTION

Systems and methods in accordance with various embodiments of the present disclosure may overcome one or more the aforementioned and other deficiencies experienced in conventional approaches to indexing and/or searching. In one embodiment, an ordered chain of filters is used that includes filters selected to handle problems or issues with the specific language(s) in which the information is received, as well as the language(s) in which results are to be obtained. These filters can be used in an appropriate order with other filters that tokenize the information, segment based on appropriate language dictionaries, and then search for synonyms in any number of appropriate languages. A dictionary-based approach is used in one embodiment to locate relevant synonyms and handle problems that are associated with specific languages. Once the synonyms are obtained, the synonyms can be typed, segmented, and otherwise processed as desired to obtain relevant tokens and synonyms useful for indexing and/or searching.

Figure 1:
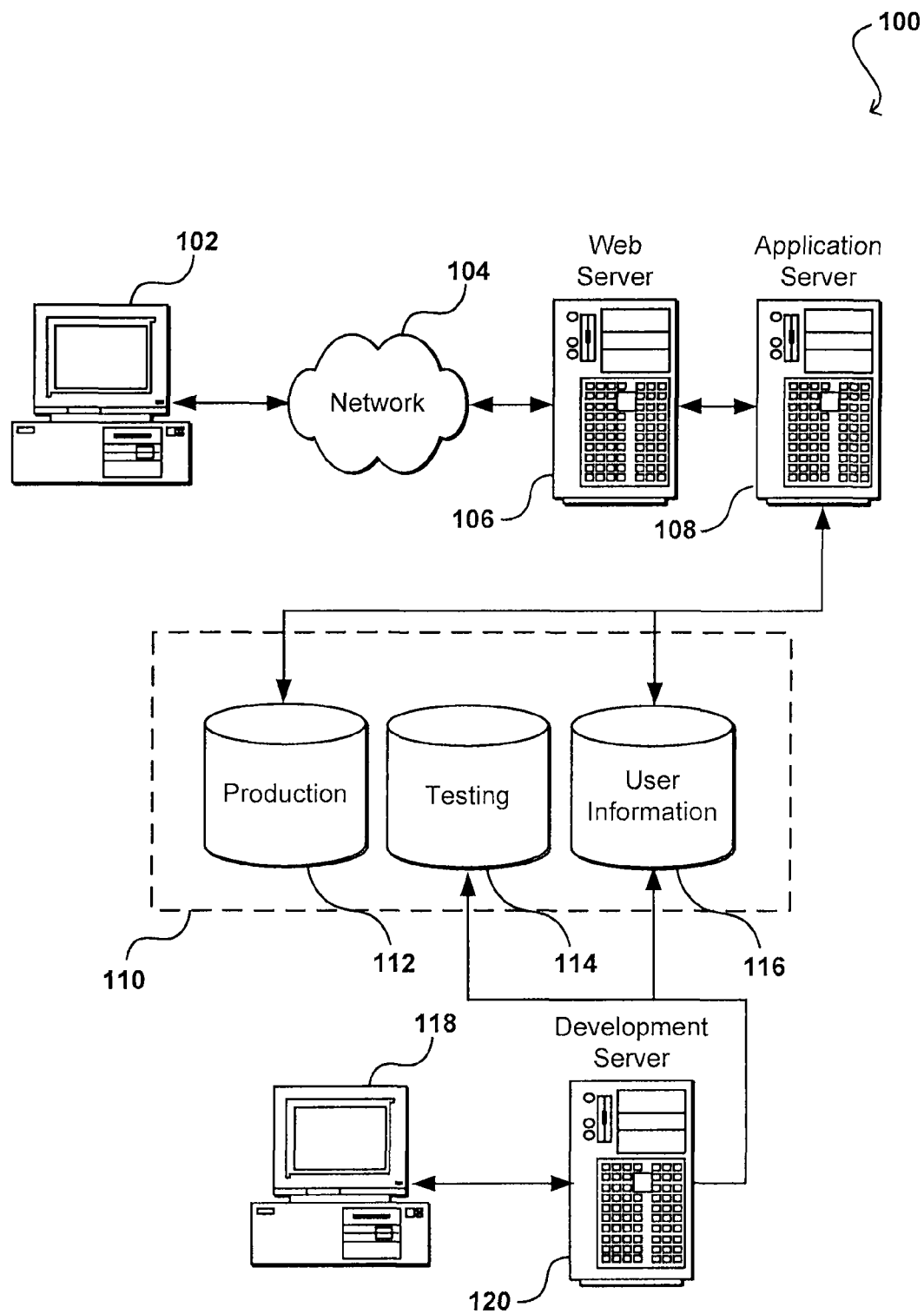
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Aspects of the various embodiments can be utilized on the production side or the development side. These aspects also can be used in other environments, where there may not be such a separation, or where there may be other portions such as a dedicated test server (not shown) or other such devices. Arrangements for testing development and production code are known in the art and will not be discussed herein in detail.

Figure 2:
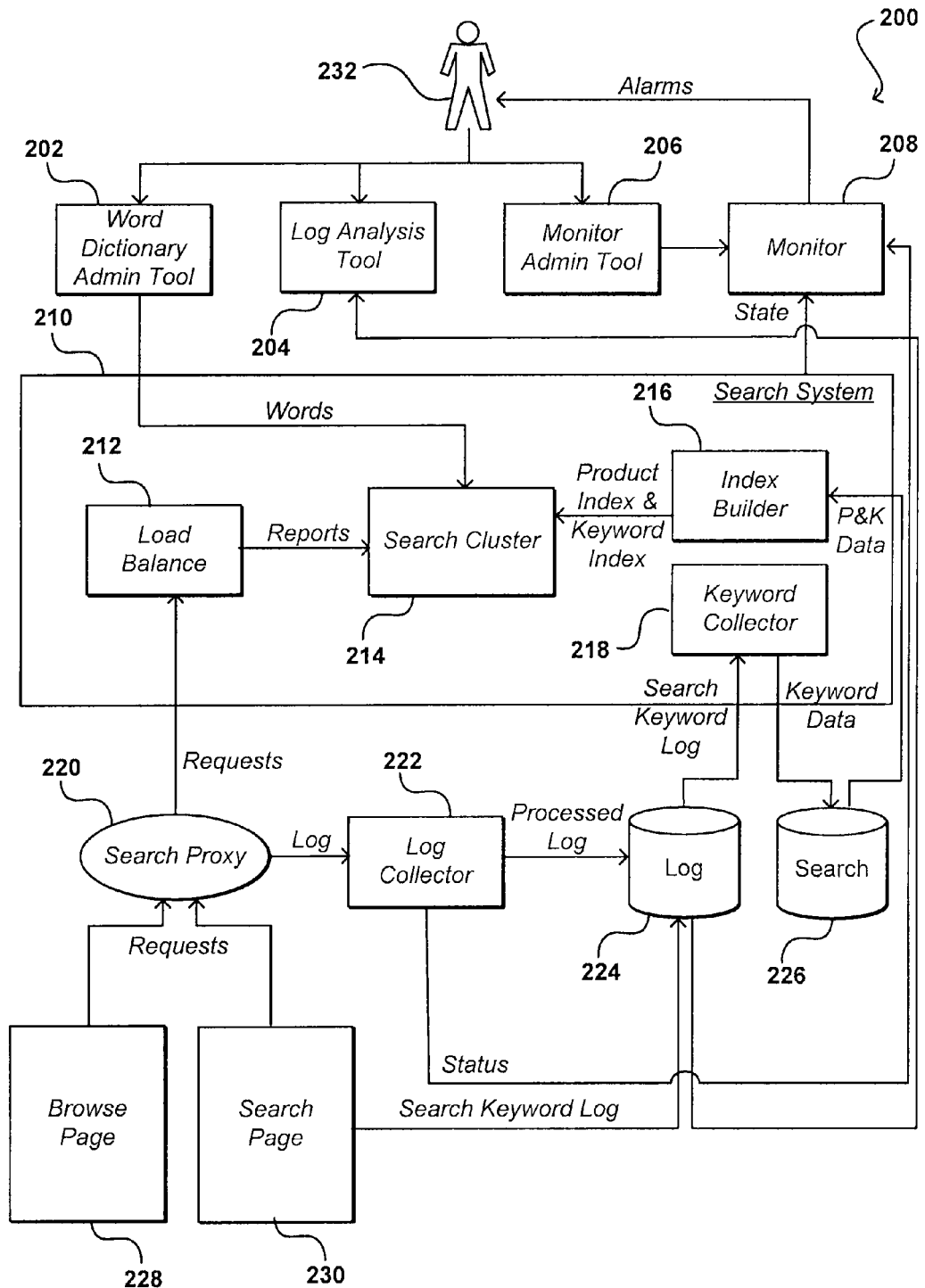
FIG. 2 illustrates a system for implementing a multi-language relevance-based approach in accordance with one embodiment.

FIG. 2 illustrates an example of a search system approach 200 that can be implemented in such an environment in accordance with one embodiment. In this example, an administrator 232 or similar user can have a number of tools available, such as a word dictionary tool 202, a log analysis tool 204, and a monitor administration tool 206 that allow the administrator to configure aspects of the search system. A word dictionary tool 202 can allow an administrator 232 to maintain a search word dictionary used for searching, which can affect the process of word analysis in the search system 210. A monitor administration tool 206 can allow an administrator 232 to quickly determine the status and/or "health" of each system component through communication with a monitor component 208. The monitor component 208 may be, for example, a daemon application that is able to check the search system 210 and detect any problems, which then can be reported (e.g., as alarms) to the administrator 232 and/or any other appropriate person, application, or component. A log analysis tool 204 can provide a human-readable user interface that allows the administrator 232 to be able to check the logs in the search system, allowing the administrator to easily locate any problems in the system. The log information can be collected by a log collector component 222, which in one embodiment is a daemon application configured to collect key logs produced by any components in the search system, process those logs, and store the log result to a log data store 224. As discussed elsewhere herein, the log data store can be a table in a database, a separate data repository, etc.

The search system 210 in this example includes a search cluster 214 having at least two search hosts or machines for serving the received search requests, generally including a master host and at least one slave host. The use of a search cluster provides advantages such as scalability and fault tolerance. The search system 210 also includes an index builder 216, such as a daemon application and a set of command line tools able to send product information and related keyword information to the search cluster 214 in order to build search indices, such as by full or incremental build processes. The search system also can include a keyword collector 218, such as a daemon application and a set of command line tools useful to update keyword data obtained from a search log into a search data store 226. The keyword collector can analyze the search log and obtain the keywords from users. The keyword collector also can maintain and optimize the number of keywords to an appropriate number, such as by checking the frequency and last time of search for each keyword, to ensure that the search results and performance are acceptable.

The search system can also take advantage of a search proxy 220, which can receive search requests from sources such as a browse page 228 or search page 230, and forward information for the requests to the search system 210. In one embodiment, the search proxy 220 is a library that can be used by clients displaying the search or browse page, for example, and that can expose search functionality provided by the search system 210 to the clients by providing easy-to-use interfaces. A search proxy 220 also can provide a connection pool to maximize the performance. In one embodiment, the search proxy works in combination with a load balancing component 212 of the search system in order to further maximize performance by distributing load appropriately across the search cluster 214. The search proxy 220 also can log each search request, including information such as processing time and processing status of each request, and pass that information to the log collector 222. The search cluster also can record each processed search request and update request, including processing time and status. The index building 216 can record the product and keyword information that was sent to the search cluster, including processing time and status information.

As discussed, the system can utilize a monitoring component 208 that is able to monitor the status of various components of the search system 210. For example, the monitor can periodically send a request (e.g., a hypertext transfer protocol (HTTP) request) to the search cluster 214 to ensure that the search cluster is active and available. The monitor also can poll or receive information periodically from the index builder 216 and/or keyword collector 218 to ensure that these components are functional. The monitor also can poll or receive information from the log collector 222 to ensure that the log collector is functional, and also can receive information from the log collector whenever there is a problem in any log collected by the log collector.

As can be appreciated, there can be many other combinations, additional components, and optional components in the implementation of FIG. 2, and these variations can be used to implement various aspects as would be apparent to one of ordinary skill in the art in light of the present disclosure.

As mentioned above, the search requests received by components such as a search proxy 220 or search cluster 214 can include a wide variety of information, such as keywords, search terms, search queries, etc. Because there can be many ways of representing information, it can be desirable for a search system to find terms, keywords, queries, or other such entities that are related to, or relevant to, the information received in each search request. For example, a user might submit a request to receive information about the local Parent-Teacher Association. The user might submit any of a number of different keywords to attempt to find this information, such as "PTA", "Parent-Teacher Association", "P.T.A.", etc. If the search system was to search only for results that exactly match the term submitted in the query, then the search results for the term "Parent-Teacher Association" might miss any documents or objects that instead simply refer to the local "PTA", for example. As such, it can be desirable to also locate results that are determined to be substantially relevant to the query. The problems can become even more difficult when a user is searching in a first language and would ideally like to also receive results in a second language. For example, a user searching in Chinese might submit the Chinese equivalent for the term "PTA", which may also have variations in Chinese, but might like to also receive search results that are in English.

Systems and methods in accordance with one embodiment address these and other aspects of a search system by providing a search dictionary that includes real-world relevance that can be continually improved, updated, scaled, and/or adapted as needed. A relevance-based dictionary and search system can address relevance at several levels, including, for example, indexing, segmenting, request handling, query formation, and/or query processing.

An approach in accordance with one embodiment forms such a dictionary using a "chain," series, or combination of components, including various filters and segmentations. These components can be utilized in a dictionary-based environment to refine the dictionary to an extent that is sufficient for the selected segmentation solution. Such an approach is particularly advantageous for multi-language search. For ease of explanation, the disclosure will explain aspects of various embodiments with respect to Chinese and English language searching, but it should be understood that the selection of languages is merely one example, and that any appropriate combination of two or more languages can take advantage of aspects of the various embodiments. Further, searches in any single one of these languages also can take advantage of various aspects as would be apparent to one of ordinary skill in the art in light of the teachings and suggestions contained herein.

When receiving search terms in Chinese and/or English, for example, it can be desirable to handle indexing and segmentation in both languages. It also can be desirable to handle synonyms and other aspects in and between both languages, and to maintain an acceptable level of relevance. While certain components exist for processing portions of the translation and performing relevance determinations, there is no existing solution that provides the desired level of functionality. Approaches in accordance with various embodiments utilize some of these and other components to provide an ordered chain of filters that includes such segmentation. The ordering of at least some of the components can be important for maximizing relevance, as well as to deal with language-specific issues. For example, users might use Chinese or English to type in numbers, which can be in either full shape or half shape form. The processing is capable of handling Chinese keywords submitted with English numbers, and other such combinations. The selection and ordering also can help to improve the performance of the relevancy determination, and can be configured in a way such that processing is shifted away from the front end or query side. The chain of filters also can include an indexing side, such that less processing can be required at query time. Thus, the chain can include query-specific filters and index-specific filters.

For example, information about an item, such as a book, might be received that includes ten attributes and their associated values for that book. An update query (e.g., an extensible markup language (XML) query) can be sent to a master host, for example, which then obtains the information about the book. The master host can index the book information such that any slave or other host in the search cluster can pull the change(s) to the index. In one example, an indexer detects the change, constructs an XML document corresponding to the change, and sends the XML document to the master for indexing. In this example, the "indexer" is a separate component running on the same computing device as the master that performs these formatting tasks, while the master performs the actual indexing.

The master host thus can utilize an indexing portion, while the slave hosts serve requests and/or queries. The master host can receive data, such as in a batch of information, and can process the data through a series of filters in the filter chain. The master and each slave can have a schema for all fields that are indexed, and each field can have a type. For the book example, 'title' is an example of a field name that can have a type such as a Chinese character string type that is defined for the system. Types can be more primitive types such as integer, string, etc., but also can include more complex types that are defined in the schema. The type of processing performed by the master can depend at least in part upon the field type. If one object has a dozen attributes, for example, a master host in one embodiment examines each field individually (e.g., in sequence). The master knows the value from the XML document for the object, for example, and can determine the type from the schema, which is associated with a series of filters. For example, if the field is determined to be of is a Chinese language type, then a specific series of several filters can be used for that type. If the field type is an integer type, then there might a different number and/or type of filters used.

FIG. 3 illustrates tables corresponding to data that is to be indexed, and which is processed using an ordered chain of filters 300 that can accept information submitted in a language such as Chinese, in accordance with one embodiment. As discussed, a customized chain of filters, tokenizers, and/or components can be used to implement a dictionary-based approach in accordance with one embodiment. The chain specifies how the tokens are generated, such as from Chinese text data, and filtered for both indexing and/or querying. In order to index the information, the information can be placed in the index of a data store with a special structure for efficient search. When querying, a user enters search query text which itself can be considered a small document that needs to be processed. Separating the indexing and querying can improve the efficiency of the query side.

In this example, an indexing process will be described, although a similar process can be used at query time as discussed elsewhere herein. At least one "term text" or phrase is received to the filter chain. The first filter in this example is a language-based whitespace filter or "tokenizer," which process the received data according to setting(s) for the filter chain. Such a tokenizer can segment the text into separate tokens based upon factors such as the presence of whitespace between characters and a change in language or character type. In the example of FIG. 3, the "term text" received contains both Chinese and English characters in a single string":

我喜欢耍雪的animal train1产品

As can be seen in the figure, this term text is segmented by the language-based whitespace filter into four tokens, with tokens 1 and 4 being separated from tokens 2 and 3 based on language type differences, and tokens 2 and 3 being separated based on whitespace between "animal" and "train". The Chinese tokens (1 and 4) are determined to have a "term type" of "cjk" associated therewith, which in this example designates the type as a Chinese text type, while the English tokens (2 and 3) are assigned a term type of "word" for an English word. Various other language types can be used as appropriate. The tokenizer itself can be a Java class, or other appropriate module of filter, which uses information for the entered term text such as the information shown in the table 302 to filter or process the term text and generate tokens for the term text as appropriate. In this example, there are four terms (corresponding to tokens), and each term is given a sequential position number (here positions 1-4). Each character has a position, in this case nineteen characters overall, running from source start position 0 and running to source start position 18. The position(s) of the character(s) in each token then are designated by the "source start, end" or similar position information. The data then can be passed through to the next filter in the chain as a set of four tokens.

The type of each token can be recognized automatically, such as by using a Java method and appropriate library to determine whether the Unicode is English, Chinese, etc. In one embodiment, an open source Java library is used to determine the encoding of characters from the input stream, and a heuristic algorithm is used to determine the actual type, such as by looking at just the first character of each token. Since the resulting data is not segmented into separate tokens in this example, the source start/end positions remain the same.

The token(s) are then passed to a character filter, such as a "half shape" character filter. In the specific example of Chinese-English translation, numbers and punctuation marks can be entered using Chinese or English/Arabic characters, which can include types referred to as "full shape" or "half shape" types. For example, the number "3" appears slightly larger in Chinese full shape form than in Arabic. Further, for full shape punctuation it is common to not insert a "space" character after the punctuation. Using this filter, any characters that differ between languages can be converted as desired. In the present example, any character entered in full shape mode via a Chinese input device can be converted into the Arabic equivalent, such as a half shape version of the same character. Since there are no full shape characters in this example, the table 304 for the data after this filter remains unchanged, as the text, type, and positions do not change. It can be appreciated that a character filter is not needed in some embodiments. For example, if the languages being addressed do not have different character types, such as full shapes and half shapes, then such a filter may not need to be added to the chain.

The data then can be passed to at least one language dictionary filter. The filter used can depend at least in part upon the type(s) of data in the token(s) for the data. In this example, the data is of a Chinese language type and an English language type, so a Chinese and/or English dictionary filter (or combination thereof) is selected. Each dictionary filter is able to analyze each corresponding token and further segment the data into appropriate tokens based on terms in the language dictionary. For example, if a token includes three words that appear in a Chinese language dictionary, then a Chinese language recognition filter can segment these into three separate tokens. In this example, the filter goes through the text of each Chinese type token and determines there are five appropriate Chinese type tokens, and that the English tokens cannot be further segmented by language. As can be seen in the table 306 for the data after the segmenting, there are five tokens each containing data of the Chinese language type and two tokens each containing data of the English language type. Each token has a sequential term position, adjusted for the presence of additional tokens, and has a number pair indicating the beginning and end position of each character in the respective token. For example, the token at term position 4 has a single character that begins and ends at position 5 of the character data (the positions running from 0-18 as discussed above).

The tokens are then passed to a synonym filter, with each of the tokens being analyzed to determine relevant synonyms. In one embodiment, a synonym configuration file is utilized that is structured to include information such as synonyms, mappings between synonyms, and details about those mappings, such as whether the synonym is appropriate for a one-way or two-way synonym test. A search is performed for each token in an attempt to locate synonyms using the synonym configuration file, with each synonym occurring in one of the appropriate language dictionaries. For each token, a one-way or two-way synonym test is used to determine appropriate synonym terms and/or phrases to use for searching. If a token is determined to benefit from a two-way synonym test, synonyms can be found from the first language to the second language and vice versa, and any document or object with one of the synonyms located for the token in either language can appear in the list of results. If a one-way synonym test is selected, then only synonyms in one language might be used. One-way tests can be appropriate when, for example, a word might have several meanings in one language such that a two-way test could result in many unrelated synonyms being selected. Further, one-way tests can be helpful for handling common spelling errors, etc. In other embodiments, an additional filter could be used to locate "related" words or characters to attempt to handle misspellings or other such input errors. In this filter, a synonym "Fisher-Price" is located for the token at position 3, as shown in table 308, and the synonym is stored in the configuration file with the appropriate mapping. The filter adds synonyms at the same "term position" as the token producing the synonym. Thus, an executed search will match against all the words at the same term position. Such an approach is useful in part because relevance is based in part on proximity, both in the query and in the results. It is possible to include multiple synonyms using such an approach since there usually are not an unwieldy number of synonyms for any given term.

The tokens in this example are next passed to a language recognition filter 310, which can be configured to handle tokens of any appropriate language type. The synonym filter described above, for example, might locate synonyms in another language type, such as the English synonym "Fisher-Price" being located for a Chinese character. In order to maintain a separation of functionality and improve the overall speed of the filter chain, the synonym filter in this example did not adjust the type of the injected synonym to indicate that the synonym was an English word, but instead typed the synonym to be the same as the Chinese character type of the original token. Accordingly, a language type recognition filter can be used to adjust the type for each synonym where the synonym is not of the same type as the original data of the token, here adjusting the type of the token to "word" as shown in table 310. The filter determines the type of the token or token string, such as by using a Java class or Java Unicode facility as discussed above.

It should be noted that for certain synonym mappings it is desirable to correctly type the injected synonyms in order to achieve maximum recall. For example, suppose as illustrated in the example of FIG. 3 that there is a bi-directional synonym mapping of "费雪,Fisher-Price". A document is thus being indexed that contains the text "费雪". The synonym filter in this example will inject "Fisher-Price" as a single token at the same position as the token including "费雪", with the same token type "cjk" as the original token "费雪". If the type of the synonym "Fisher-Price" was not updated, a user searching for "Fisher-Price" or "Fisher Price" would not be able to retrieve the document. For example, if the user enters "Fisher-Price" as the query, the word delimiter filter will segment "Fisher-Price" into "Fisher" and "Price", neither of which matches with the indexed "Fisher-Price" token. If, instead, the user enters "Fisher Price", the document cannot be retrieved because the Chinese whitespace filter segments the token into two separate tokens. To enable a correct match, the word delimiter filter can be configured to segment the injected "Fisher-Price" token at indexing time. A word delimiter filter may not work on Chinese character types, however, as delimiter functionality might only be appropriate for languages such as English, etc., which are based on Arabic letters and numbers.

In order to address this issue, the language type recognition filter is used after the synonym filter to correctly type the injected tokens. Such an approach enables the logic of the synonym filter to remain relatively simple, with the structure of the synonym configuration file being simple and easier to maintain. In other embodiments, the synonym filter can itself support typing of individual synonyms. Instead of a mapping entry of "费雪,Fisher-Price", there could instead be a mapping that includes type information added to each of the synonyms, such as "费雪[type: cjk],Fisher-Price[type:word]", for example. Such an approach can provide enhanced performance in certain situations where the type info is pre-configured in the synonym configuration file.

After the synonyms and injected and (re-)typed, the tokens in this example are passed to a lowercase filter that converts all uppercase words or tokens in English or another such language to all-lowercase characters, which generally is used for indexing. For case-sensitive searching, or for languages where case is not an issue, such a filter may not be beneficial and can be omitted. Both queries and indexes are generally converted to lower case for English-inclusive search. In this case, "Fisher-Price" in term position 3 is adjusted to "fisher-price" as illustrated in the table 312.

Finally, the tokens in this example are passed to a word delimiter filter. Such a filter is able to further segment the tokens by locating and removing any punctuation, and generating new segments based thereon. It can be beneficial to perform punctuation-based segmentation after the synonym filter, such that "Model-123" can have "123" as a synonym, thus reducing the number of tokens. Further, if the term "Model-123" had been segmented into "Model" and "123" before finding synonyms, the synonyms located would not necessarily be as relevant as would otherwise be located for "Model-123". In the present example, "fisher-price" is segmented into separate tokens for "fisher" and "price" as shown in the table 314, and the positions of the tokens are updated accordingly. The tokens and relevant synonyms then can be used for indexing and/or searching as appropriate.

Figure 4:
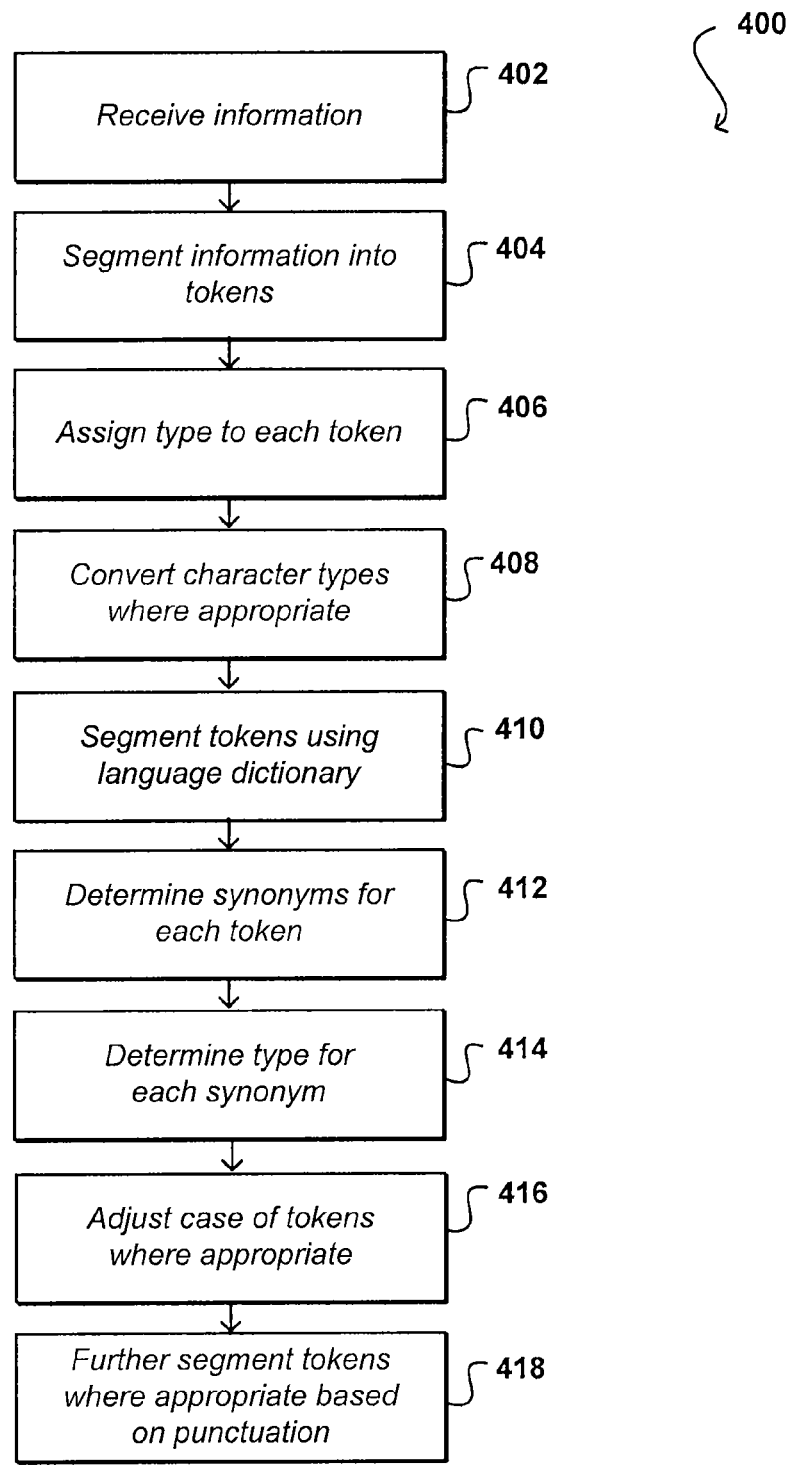
FIG. 4 illustrates a steps of a method that can be used in accordance with one embodiment.

As discussed, the chain described above performs specific functions in a beneficial order, but the number of filters, methods, or other modules used to perform these functions, and the functionality of each of the filters, methods, or other modules, can vary as would be apparent to one of ordinary skill in the art in light of the present disclosure. FIG. 4 addresses these variations by setting forth a general approach 400 that can be used for multi-language relevance based search in accordance with one embodiment. The functionality described can be implemented in any number of ways in any appropriate environment. The approach will be described for indexing, but it should be understood that a similar approach can also be used at query time for any received query data.

In this approach, information for a data object is received 402, where the information includes at least one term relating to the data object. The data is segmented into tokens 404, such as by removing spaces between characters and segmenting based on the prior position of the spaces. The tokens also are assigned a type 406, indicating the language corresponding to the data in each token. Depending upon the language types of the tokens, the characters can be converted to a corresponding character in another type as appropriate 408. As discussed, in the case of Chinese language types this can involve converting from a full shape character to a half shape character more appropriate for English or similar search. The tokens then can be analyzed using at least one language filter, appropriate for each token, in order to further segment each token if appropriate based upon the terms in the respective language dictionary 410. After any further segmentation is accomplished based on the type of the tokens, each token can be analyzed to determine appropriate synonyms 412. As discussed above, this can include determining whether to perform a one-way or two-way test based on the term, and then locating any synonyms in the desired language(s) and storing those synonyms at the same position of each token. Each located synonym can also be typed appropriately 414. Depending upon the language and/or search approach used, the case of the tokens can be adjusted 416, such as by placing the tokens into all lowercase. Any punctuation then can be removed from the tokens, and the tokens further segmented based on the position(s) of the removed punctuation 418. Although functions such as a lowercase function can be performed at various places in the process, certain steps are advantageously performed before or after other steps. For example, as discussed above it can be advantageous in at least some embodiments to remove punctuation after locating synonyms, in order to improve the relevance of the synonyms. The ordering of other functions can also depend upon the specific implementation.

FIG. 5 shows data 500 corresponding to search query text, such as may be submitted by a user, passing through an ordered chain of filters in accordance with one embodiment.

In this example, a user submits a search query phrase containing the following English and Chinese text:

Fisher-Price 产品

The filter chain selected for this search query includes filters similar to those discussed above with respect to the text to be indexed. As should be understood, the chain can also include additional or alternative filters as discussed elsewhere herein. In this example, a language-based whitespace filter is first used to segment the text into separate English and Chinese tokens, each of an appropriate type, as illustrated in the respective table 502. Since one of the tokens is of a Chinese language type ("cjk"), a half shape character filter is selected to handle any full shape characters. In this case, since there are no full shape characters the data in table 504 does not change.

The tokens then are passed through a lowercase filter, which in this case changes "Fisher-Price" to "fisher-price" as discussed above, and as illustrated in table 506. The tokens then are passed through a word delimiter filter, which segments "fisher-price" into separate "fisher" and "price" tokens as illustrated in table 508. The tokens also can be passed through a language dictionary filter to further segment based on language, but in this case no changes are needed as illustrated in table 510. In this example, three tokens then are used for the search query.

In this example, since the indexing steps already include synonyms, there is no need for the query step also to include synonym detection. In other embodiments, filters similar to those used above for indexing can also be used to determine synonyms to be used in searching. Various other filters can be used as discussed above and as appropriate.

Since search functionality often involves multiple hosts and/or machines, as described above, an approach such as that described with respect to FIG. 4 can be implemented in a master-slave architecture wherein machines can be added as desired based on factors such as load and performance. In one embodiment, relevance-based search functionality can be implemented using a server solution such as Solr, an open source enterprise search server taking advantage of aspects such as Java libraries and XML document processing. Solr utilizes a flexible XML-based configuration for deploying components and thus provides a highly scalable master-slave environment that allows for packaged deployment. Master and slave hosts can be declaratively described, such that master and slaves can be deployed and the configuration handled manually. An interface such as the Lucene API from Apache can be used to access the system, with any customizations necessary for the specific implementation. At the indexing and search level, the master and slave hosts behave essentially in the same manner, and can run the same software for indexing data, querying, etc.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of indexing text in multiple language types with synonyms in each language type, comprising:
   receiving information to be indexed in at least one language type;
   removing spaces between characters and segmenting the information to be indexed into at least one token;
   determining, using at least one processor of at least one computing device, a language type for each token;
   analyzing, using the at least one processor of the at least one computing device, a language dictionary for the determined language type of each token and further segmenting the information into at least one additional token when contents of the token correspond to separate entries in the language dictionary;
   searching for synonyms of the multiple language types corresponding to the contents of each token after analyzing the language dictionary for each token;
   using the at least one processor of the at least one computing device, removing punctuation from each token and further segmenting the information into at least one additional token where punctuation is removed; and
   storing the synonyms and contents of each token for use in indexing the information.

2. A method according to claim 1, further comprising:
   converting any full space characters to half space characters before analyzing the language dictionary for the determined language type of each token.

3. A method according to claim 1, further comprising:
   determining for each token whether to perform a one way or a two way test for synonyms.

4. A computer-implemented method of indexing terms in multiple languages, comprising:
   segmenting information to be indexed into at least one token;
   determining, using at least one processor of at least one computing device, a language type for each token;
   analyzing, using the at least one processor of the at least one computing device, a language dictionary for the determined language type of each token and further segmenting the information into at least one additional token where appropriate based upon contents of the language dictionary;
   using the at least one processor of the at least one computing device, searching for synonyms in at least one of the multiple languages corresponding to the contents of each token after analyzing the language dictionary for each token; and
   storing the synonyms and contents of each token for use in indexing the information.

5. A method according to claim 4, further comprising:
   converting a character type for at least one token.

6. A method according to claim 5, wherein:
   the character type is one of a full shape type and a half shape type.

7. A method according to claim 4, further comprising:
   determining a language type for each synonym and each token.

8. A method according to claim 4, further comprising:
   re-typing each synonym there the language type of the synonym does not match the language type of the respective token.

9. A method according to claim 4, further comprising:
   converting contents of at least one token to one of a lowercase and an uppercase format.

10. A method according to claim 4, further comprising:
    removing punctuation from at least one token after searching for synonyms; and
    segmenting the token into at least one additional token based on the removed punctuation.

11. A method according to claim 4, wherein:
    the information is one of information for a data object to be indexed and information corresponding to a received query.

12. A method according to claim 4, further comprising:
    determining for each token whether to perform a one way or a two way test for synonyms.

13. A method according to claim 4, wherein:
    steps of the method are performed by an ordered chain of filters.

14. A method according to claim 13, wherein:
    the filters are able to be injected and removed from the chain depending at least in part upon the information to be indexed.

15. A system for indexing terms in multiple languages, comprising:
    a processor; and
    a memory device including instructions that, when executed by the processor, cause the processor to:
       segment information to be indexed into at least one token;
       determine a language type for each token;
       analyze a language dictionary for the determined language type of each token and further segmenting the information into at least one additional token where appropriate based upon contents of the language dictionary;
       search for synonyms in at least one of the multiple languages corresponding to the contents of each token after analyzing the language dictionary for each token; and
       store the synonyms and contents of each token for use in indexing the information.

16. A system according to claim 15, wherein the memory device further includes instructions that, when executed by the processor, cause the processor to:
    convert a character type for at least one token.

17. A system according to claim 15, wherein the memory device further includes instructions that, when executed by the processor, cause the processor to:
   determine a language type for each synonym and each token.

18. A system according to claim 15, wherein the memory device further includes instructions that, when executed by the processor, cause the processor to:
   convert contents of at least one token to one of a lowercase and an uppercase format.

19. A system according to claim 15, wherein the memory device further includes instructions that, when executed by the processor, cause the processor to:
   remove punctuation from at least one token after searching for synonyms; and
   segment the token into at least one additional token based on the removed punctuation.

20. A system for indexing text in multiple language types with synonyms in each language type, comprising:
   a processor; and
   a memory device including instructions that, when executed by the processor, cause the processor to:
      receive information to be indexed in at least one language type;
      remove spaces between characters and segmenting the information to be indexed into at least one token;
      determine a language type for each token;
      analyze a language dictionary for the determined language type of each token and further segmenting the information into at least one additional token when contents of the token correspond to separate entries in the language dictionary;
      search for synonyms of the multiple language types corresponding to the contents of each token after analyzing the language dictionary for each token;
      remove punctuation from each token and further segmenting the information into at least one additional token where punctuation is removed; and
      store the synonyms and contents of each token for use in indexing the information.

21. A computer program product embedded in a non-transitory computer readable storage medium and including processor-executable instructions for indexing terms in multiple languages, comprising:
   program code for segmenting information to be indexed into at least one token;
   program code for determining a language type for each token;
   program code for analyzing a language dictionary for the determined language type of each token and further segmenting the information into at least one additional token where appropriate based upon contents of the language dictionary;
   program code for searching for synonyms in at least one of the multiple languages corresponding to the contents of each token after analyzing the language dictionary for each token; and
   program code for storing the synonyms and contents of each token for use in indexing the information.

22. A computer program product according to claim 21, further comprising:
   program code for converting a character type for at least one token.

23. A computer program product according to claim 21, further comprising:
   program code for determining a language type for each synonym.

24. A computer program product according to claim 21, further comprising:
   program code for converting contents of at least one token to one of a lowercase and an uppercase format.

25. A computer program product according to claim 21, further comprising:
   program code for removing punctuation from at least one token after searching for synonyms; and
   program code for segmenting the token into at least one additional token based on the removed punctuation.

* * * * *

UNITED STATES PATENT AND TRADEMARK OFFICE
CERTIFICATE OF CORRECTION

PATENT NO.         : 8,135,580 B1                              Page 1 of 1
APPLICATION NO.    : 12/195083
DATED              : March 13, 2012
INVENTOR(S)        : Yuhui Jin et al.

It is certified that error appears in the above-identified patent and that said Letters Patent is hereby corrected as shown below:

On Title page of Letters Patent, item 75 please correct inventor's name from "Daniel He," to --Cheng He--.

Signed and Sealed this
First Day of May, 2012

David J. Kappos
*Director of the United States Patent and Trademark Office*